United States Patent
Krimmer et al.

[11] Patent Number: 6,052,995
[45] Date of Patent: Apr. 25, 2000

[54] VALVE FOR AN INTERNAL COMBUSTION ENGINE, AND AN INTERNAL COMBUSTION ENGINE INCLUDING THE VALVE

[75] Inventors: Erwin Krimmer, Pluederhausen; Wolfgang Schulz, Bietigheim-Bissingen, both of Germany

[73] Assignee: Robert Bosch GmbH, Stuttgart, Germany

[21] Appl. No.: 08/928,509

[22] Filed: Sep. 12, 1997

[30] Foreign Application Priority Data

Sep. 12, 1996 [DE] Germany .............. 196 37 055

[51] Int. Cl.⁷ .................................................. F02B 33/44
[52] U.S. Cl. .......................... 60/611; 123/564; 251/152
[58] Field of Search ........................ 123/564; 60/611; 251/148, 152; 285/361, 396

[56] References Cited

U.S. PATENT DOCUMENTS 4,509,719  4/1985  Uomala et al. ................... 251/214
4,849,897  7/1989  Ciccarone ........................... 60/611

FOREIGN PATENT DOCUMENTS 38 04 013 A1  2/1989  Germany .
44 41 874 A1  5/1996  Germany .
5-156957  6/1993  Japan ................................ 123/564

*Primary Examiner*—Noah P. Kamen
*Attorney, Agent, or Firm*—Ronald E. Greigg; Edwin E. Greigg

[57] ABSTRACT

An internal combustion engine that has an intake device with a turbocharger compressor device with a valve in a bypass line that bypasses the compressor device. To assure a simple, economical installation of the valve in a way secured against relative rotation, the valve is secured to a tubular receiving element, by means of a bayonet mount, formed by the valve and receiving element. The valve is intended for internal combustion engines that are equipped with a turbocharger compressor device.

18 Claims, 5 Drawing Sheets

VALVE FOR AN INTERNAL COMBUSTION ENGINE, AND AN INTERNAL COMBUSTION ENGINE INCLUDING THE VALVE

BACKGROUND OF THE INVENTION

The invention is based on a valve for an internal combustion engine and to an internal combustion engine including the valve. One such valve is already known (German Offenlegungsschrift DE-OS 38 04 013), which is intended for internal combustion engines that have supercharging of the aspirated air by a compressor device, such as a turbocharger. Mechanically driven compressor devices, in particular, because of their inertia have the property that at the transition from the supercharged mode with the compressor device to the overrunning mode of the engine contemplated when the compressor device is not in operation, so-called afterrunning of the compressor device can occur. With the throttle valve already closed, air continues to be fed by the compressor device and then strikes the closed throttle valve and then flows back again, with the possible result being damage to or even destruction of the compressor device. To prevent this, a bypass line is provided, which branches off upstream of the throttle valve and leads back to the intake tube farther upstream of the compressor device. The valve is accommodated in the bypass line and opens upon engine overrunning, to divert the air flowing back from the closed throttle valve around the compressor device in the bypass line opened by the valve. The bypass line is embodied as a hose, in which the valve is typically incorporated by two hose clamps. At the transition from the supercharged mode to the overrunning mode without the compressor device, a relatively high overpressure in the hose can occur, with the risk that the valve will come loose at the hose clamps. Moreover, this manner of fastening with hose clamps is relatively complicated and expensive and does not allow economical assembly.

OBJECT AND SUMMARY OF THE INVENTION

The valve according to the invention and the internal combustion engine have the advantage over the prior art that reliable mounting of the valve, secure against relative rotation, is accomplished. A particular advantage is that the valve can be mounted in a simple way on the intake device, thus assembly costs are reduced. Another particular advantage is the valve is simple and compact in design.

By the provisions recited herein advantageous further features of and improvements to the valve and to the internal combustion engine are possible.

Another advantage is a stublike receiving element for the valve can be embodied with a variable opening cross section, to allow easy adaptation of the quantity of air flowing in the bypass line around the compressor device to higher-powered or lower-powered engines. Another advantage is a detent connection of two housing parts of the valve, which permits a small, compact, lightweight construction of the valve. It is especially advantageous that a diaphragm plate of the valve can be made heavier with weights, if needed. Therefore, the operating noise of the valve is modified to enable optimal noise tuning in the vehicle by an adapted vibration tuning.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
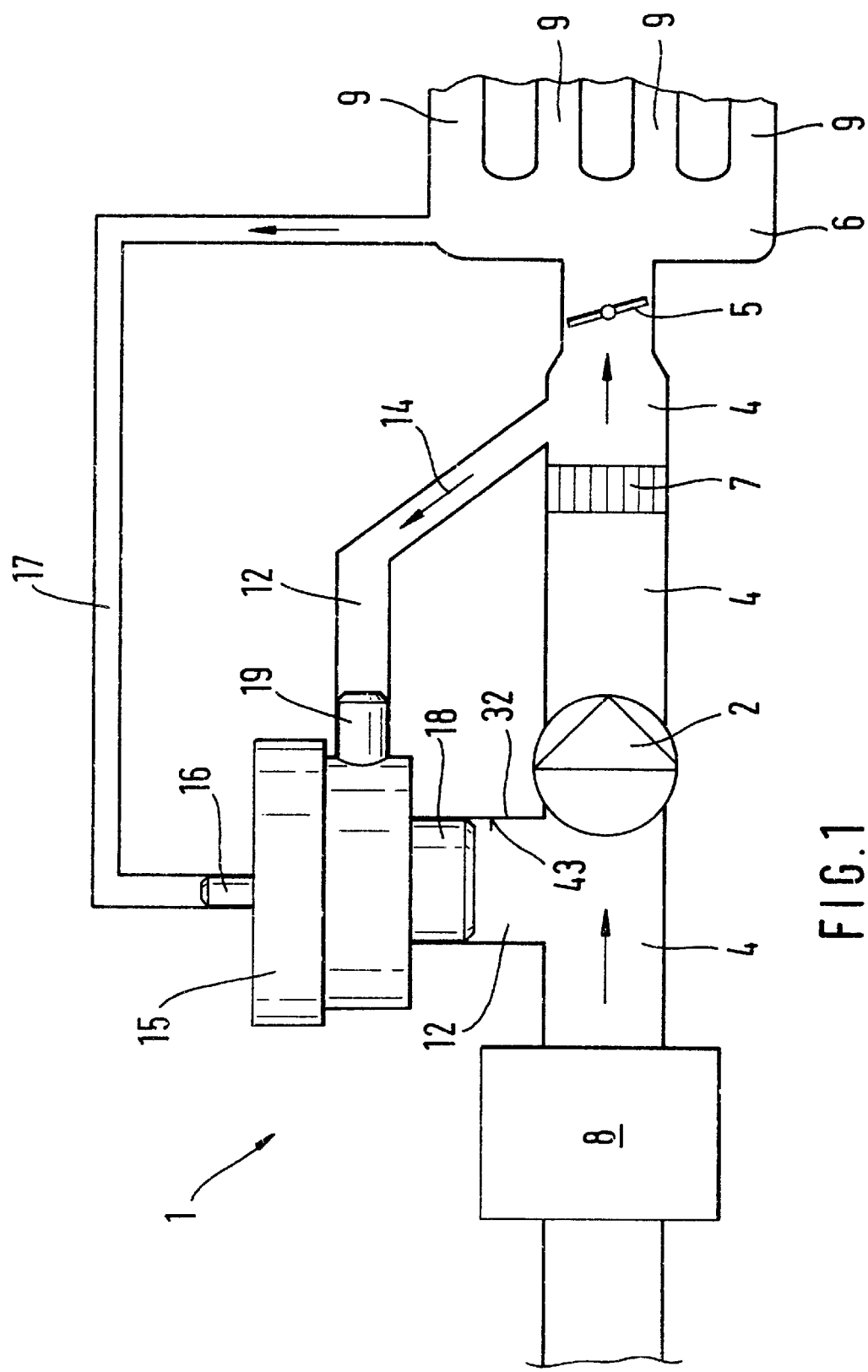
FIG. 1 is a schematically simplified view which shows an internal combustion engine with a compressor device and a valve.

FIG. 1 in a schematically simplified way shows an internal combustion engine 1, which has a compressor device 2 for compressing the air aspirated by the engine 1. The compressor device may be a mechanical supercharger of a known type, for instance a Roots supercharger, a vane-cell supercharger, a spiral supercharger, a rotary piston supercharger, an exhaust turbocharger, or a pressure-wave supercharger. The compressor device 2 is provided on an intake device, which is embodied by an intake tube 4, an intake manifold 6, and a plurality of individual intake tubes 9 of the engine 1. For example, the aspirated air is aspirated via an air filter, not shown in detail, into the intake tube 4 and passes further downstream to the compressor device 2. Next, the aspirated air, under certain operating conditions of the engine 1, is compressed by the compressor device 2 and then metered, by a throttle device 5 provided downstream of the compressor device 2, and the aspirated air then flows on into the intake manifold 6. The throttle device 5 is embodied in the form of a throttle valve, for instance, and is accommodated rotatably in the intake tube 4. A charge air cooler 7 of a known type can be installed between the compressor device 2 and the throttle valve 5. An air flow rate meter 8, of a type known for instance from German Offenlegungsschrift 44 41 874, U.S. Ser. No. 08/682,599 filed Aug. 26, 1996, may also be provided upstream of the compressor device 2, in order to ascertain the flow rate or mass of air flowing in the intake tube 4. The air aspirated by the engine 1 is compressed by the compressor device 2 and cooled for instance by the charge air cooler 7, and then in the open position of the throttle valve 5 flows on via the intake manifold 6 into the individual intake tubes 9, into which fuel is fed, for instance by means of fuel injection valves not shown in further detail, for the sake of preparing an ignitable fuel-air mixture, which can then be combusted in combustion chambers of the engine 1.

Especially mechanically driven compressor devices 2, because of their inertia, have the property that afterrunning of the compressor device 2 can occur at the transition from the supercharged mode with the compressor device 2 to the overrunning mode without operation of the compressor device 2. With the throttle valve 5 already closed, air is fed by the compressor device 2 and strikes the closed throttle valve 5 and flows back again, and damage to the compressor device 2, or even its destruction may occur. To prevent this, a bypass line 12 is provided for example as a hose, which as shown in FIG. 1 branches off between the throttle valve 5 and the compressor device 2 and leads upstream of the compressor device 2 back into the intake tube 4. The bypass line 12 is connected to a valve 15, which opens or closes the bypass line 12. Such a valve 15 is known to one skilled in the art as an overrunning shutoff valve. The valve 15 is secured to the intake tube 4 with a connection stub 18 introduced into a tubular receiving element 32 provided upstream of the compressor device 2 and embodied laterally on the intake tube 4. Only in certain operating states of the engine 1, especially overrunning, the valve 15 assumes an open position; other times, the valve is closed. It is possible at the transition from the supercharged mode of the compressor device 2 to the overrunning mode of the engine 1 for the air, unnecessarily fed because of the afterrunning of the compressor device 2, to bypass the compressor device 2 in the bypass line 12 when the throttle valve 5 is closed. The direction of the air flowing back in the bypass line 12 is indicated in FIG. 1 by an arrow 14. The receiving element 32 may be embodied with a variable opening cross section of a receiving opening 43, in order to enable adapting the quantity of air bypassing the compressor device 2 in the bypass line 12 to engines of higher or lower power. The triggering of the valve 15 is effected by the negative pressure that is established downstream of the throttle valve 5 as the throttle valve 5 closes; this pressure is delivered to the valve 15 via a control line 17, which is connected to the intake manifold 6 and is embodied as a hose, and which for this purpose has a stublike negative pressure connection 16. From the valve 15 the control line 17 leads into the intake manifold 6 downstream of the throttle valve 5. However, it is also possible for the control line 17 downstream of the throttle valve 5 to be connected to the intake tube 4. As shown in further detail in FIG. 2, the valve 15 has a two-part housing, which is composed of a cup-shaped lower housing part 20 and an upper housing part 21. Both housing parts 20, 21 are preferably of plastic. The upper housing part 21 is inserted into the cup-shaped, somewhat larger-cross-section lower housing part 20. For connecting the upper housing part 21 to the lower housing part 20, a detent connection is used, which is formed by detent hooks 57 that protrude somewhat from a jacket face 56 of the upper housing part 21. The detent hooks 57 are distributed uniformly over the circumference of the jacket face 56 of the upper housing part 21 and have an arrowhead-shaped or barblike cross section that tapers toward the connection stub 18. Corresponding to the detent hooks 57, the lower housing part 20 has rectangular detent openings 58. When the upper housing part 21 is inserted into the lower housing part 20, an edge 55 of the upper housing part 21 is bent into a V and the detent hooks 57 are elastically deformed somewhat, radially inward toward a longitudinal axis 60 of the valve 15, and in a detent position, attained once the upper housing part 21 has been fully introduced into the lower housing part 20, locks into place, with the detent hooks 57, in the correspondingly provided, rectangular detent openings 58 of the lower housing part 21, thus making a releasable connection of the two housing parts 20, 21. Should it become necessary to remove the upper housing part 21, all that is needed is to press the detent hooks 57 radially inward toward the longitudinal axis 60, and then the upper housing part 21 can be pulled out of the lower housing part 20.

A movable wall, in the form of an elastic diaphragm 22, is fastened by a circumference of the wall between the two housing parts 20, 21. The diaphragm 22 rests with the circumference on a radially inward-extending clamping collar 59 of the lower housing part 20, and the circumference of the diaphragm is elastically pressed by the edge 55 of the upper housing part 21 into its locked state and retained there. The diaphragm 22 divides a valve chamber 24 from an opposite control chamber 25. The control chamber 25 communicates with the negative pressure connection 16 of the valve 15. On the side of the diaphragm 22 toward the negative pressure connection 16, a diaphragm plate 26 is joined to the diaphragm 22. The diaphragm plate serves to lend a certain rigidity to the diaphragm 22 and to support a spring 27. The spring 27 contacts the diaphragm plate 26 and rests on a bottom of the 28 upper housing part 21. If needed, the diaphragm plate 26 can be made heavier with weights; therefore, the operating noise of the valve 15 is modified to enable optimal noise tuning in the vehicle by an adapted vibration tuning.

The diaphragm 22, on the side remote from the negative pressure connection 16 and toward the valve chamber 24, has an encompassing bead 29, which in the closing position of the valve 15 is pressed against a sealing seat 30 by the spring force of the spring 27. As the encompassing bead rests on the sealing seat 30 the bead covers a circular opening 31 to the connection stub 18, thereby interrupting a fluidic communication from the connection stub 18 via the valve chamber 24 to a bypass stub 19 of the valve 15, which is provided crosswise to the connection stub 18 and also communicates with the valve chamber 24. When the diaphragm 22 has lifted in the direction of the negative pressure connection 16, the opening 31 is uncovered more or less extensively by the diaphragm 22, so that a fluidic communication is established between the connection stub 18 and the bypass stub 19 of the valve 15. The bypass stub 19 serves to connect the bypass line 12, embodied as a hose, for the valve 15.

If the throttle valve 5 is closed, then the pressure downstream of the throttle valve 5 drops, and also drops in the control chamber 25 via the control line 17, so that the force acting on the diaphragm 22 as a consequence of the pressure in the valve chamber 24 suffices to overcome the force of the spring 27 and lift the diaphragm 22 from the sealing seat 30.

The valve 15 is retained on the intake tube 4 by the connection stub 18, which is introduced into the tubular receiving element 32 on the intake tube 4. To seal off the connection stub 18 in the receiving element 32, a sealing ring 33 is placed in an annular groove 34 on the connection stub 18 and is received elastically, in the built-in state, by a dent indentation 35 formed in an inner wall 45 of the receiving opening 43 in the receiving element 32. The receiving opening is stepped and leads into the intake tube 4. For retention of the valve 15 secured against relative rotation in the receiving element 32, a bayonet mount which is formed by at least one bayonet locking bar 36 and one bayonet lock 39 is provided on the receiving element 32.

Figure 2:
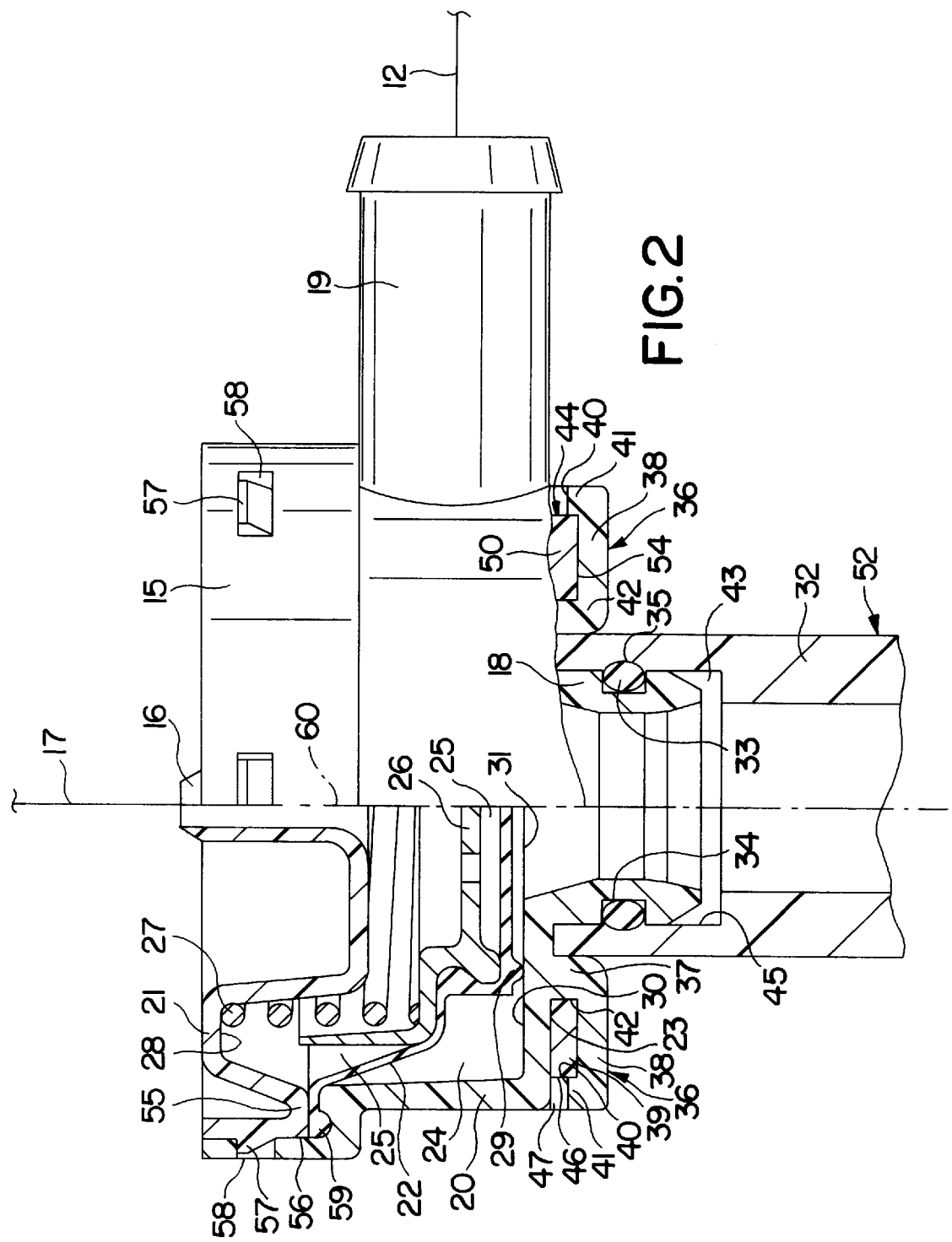
FIG. 2 is a fragmentary cross section through the valve of the invention.

As shown in FIG. 2, two bayonet locking bars 36 are present on the valve 15, embodied in the form of an angle piece. The angle pieces comprise plastic like the lower housing part 20 and can be bent in spring-elastic fashion and are disposed opposite one another. The angle pieces each have one axial part 37, protruding from a lower face 23 of the lower housing part 20. The face is toward the connection stub 18, in the direction of the longitudinal axis 60 of the valve 15, and oriented crosswise to the axial part 37. The radially outward-extending, protruding radial parts of the angle pieces have detent lugs 41 on their outer ends 40 and oriented toward the lower face 23 of the lower housing part 20, and these lugs serve to lock the angle pieces to the bayonet locks 39.

Figure 3:
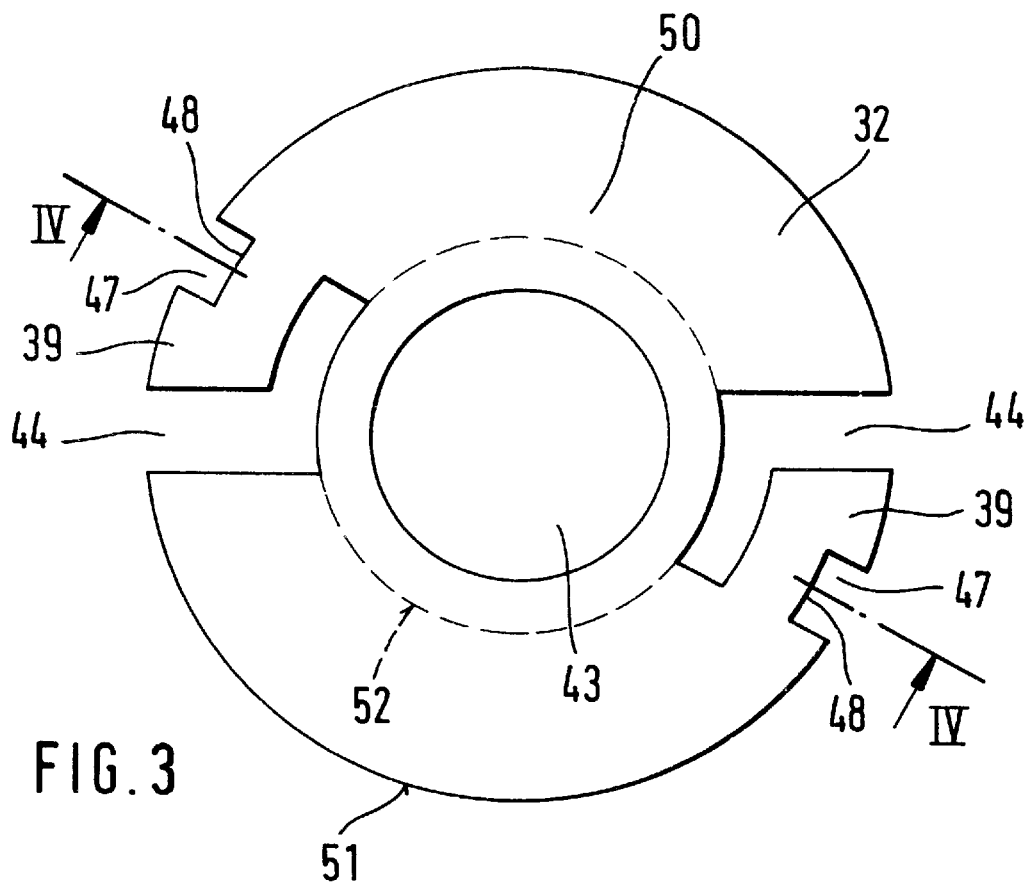
FIG. 3 is a plan view of the receiving element for the valve.
Figure 4:
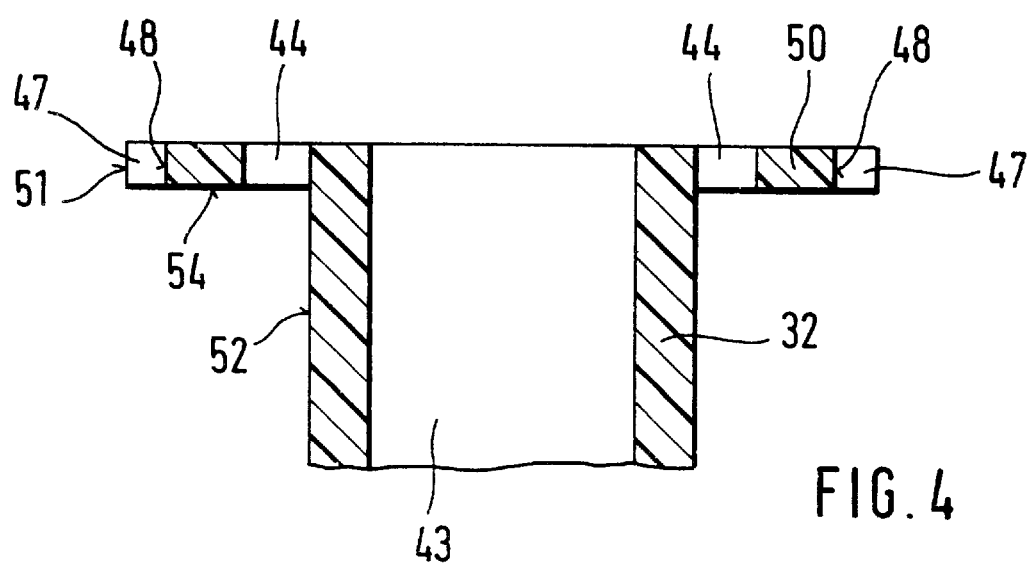
FIG. 4 is a section through the receiving element of FIG. 3 taken along a line IV—IV.

FIG. 3 is a plan view of the receiving element 32 without the valve 15 inserted. The receiving element 32 has a collar 50 with an annular face that radially protrudes past the receiving opening 43 of the receiving element 32 on which the bayonet locks 39 for the bayonet locking bars 36 are provided. For mounting the valve 15, the valve is introduced with its connection stub 18 into the receiving opening 43 of the receiving element 32. In the process, the two bayonet locking bars 36 engage suitably recessed, L-shaped recesses 44 that extend from an outer face 51 of the collar 50 partway, approximately as far as a smaller-cross-section jacket face 52 of the receiving element 32, with their radial parts 38, which then protrude beyond a lower annular face 54 of the collar 50. The recesses 44 are shown in more detail in FIG. 4, which is a sectional view along a line IV—IV of FIG. 3. With radially inward-extending, rectangular notches 47 on the outer face 51, the recesses 44 define the bayonet locks 39. After the valve 15 is introduced with the connection stub 18 into the receiving opening 43, the valve can be rotated clockwise; this causes the bayonet locks 39 to engage the interstices 46, only partly visible in FIG. 2, between the radial parts of the angle pieces and the lower face 23 of the lower housing part 20, and the ends 40 slide, spread apart by the lower face 23, along the annular face 54. On reaching a final rotary position of the valve 15, the detent lugs 41 provided on the ends 40 of the angle pieces snap into the notches 47 and thus lock against detent faces 48 of the notches 47.

Figure 5:
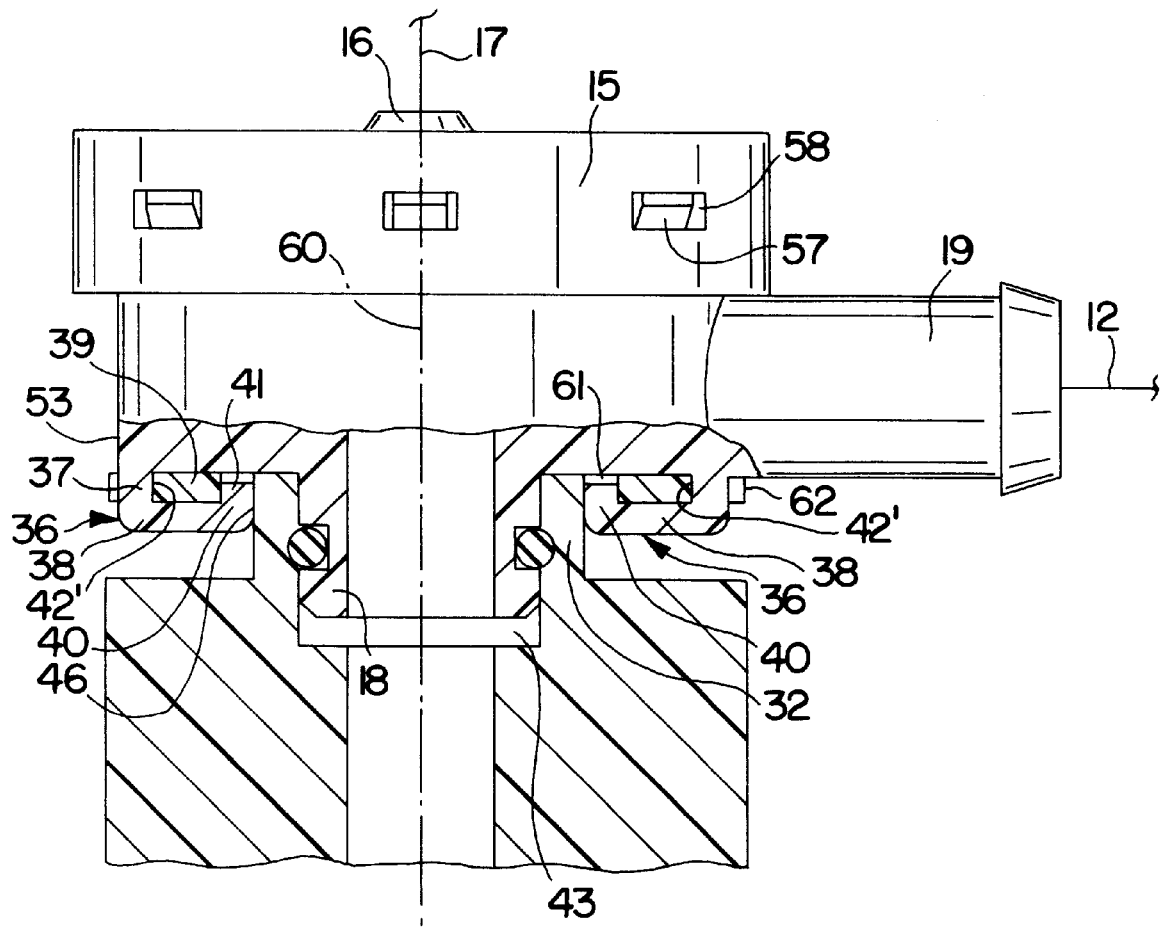
FIG. 5 shows a second exemplary embodiment of the valve according to the invention.

In FIG. 5, a second exemplary embodiment of the invention is shown, in which all the elements that are identical to or function the same as those of FIGS. 1–4 are identified by the same reference numerals. FIG. 5, in a fragmentary sectional view, shows a valve 15, which has the same internal construction as the valve 15 of FIG. 2. The bayonet mount is again formed by two angle pieces, which represent the bayonet locking bars 36 for the bayonet locks 39. In a modification of the embodiment of the angle pieces of FIG. 2, the angle pieces of FIG. 5 protrude from an outer face 53 of the lower housing part 20 of the valve 15 and extend radially inward, so that both ends 40 of the radial parts 38 of the angle pieces face toward the connection stub 18. Detent lugs 41 are again embodied on the ends 40 of the angle pieces and serve to lock with the bayonet locks 39 on the collar 50 of the receiving element 32.

Figure 6:
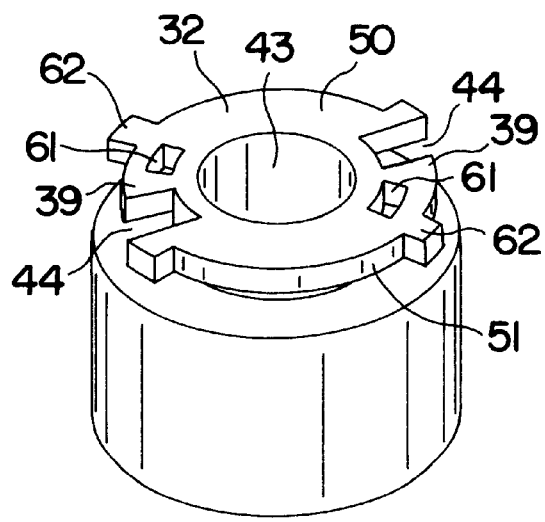
FIG. 6 shows a perspective view of the receiving element of FIG. 5.

As shown in further detail in FIG. 6, which is a perspective view of the receiving element 42, the bayonet lock 39, for receiving the angle pieces or for the passage through it of the radial parts, likewise has two opposed recesses 44, which are essentially shaped merely rectangularly. Once the angle pieces have been introduced into the recesses 44, the valve 15 can be rotated clockwise for example; in the process, the bayonet locks 39, defined by the recesses 44 and the outer face 51 of the collar 50, bend the angle pieces open somewhat, and these angle pieces then, in a final rotary position of the valve 15, lock with the detent lugs 41 in corresponding rectangular detent recesses 61 made in the collar 50. The final rotary position of the valve 15 is defined by portions 62 extending further radially outward from the outer face 51 of the collar 50 and located opposite one another, so that in the final rotary position of the valve the angle pieces can come to a stop against these portions 62.

Figure 7:
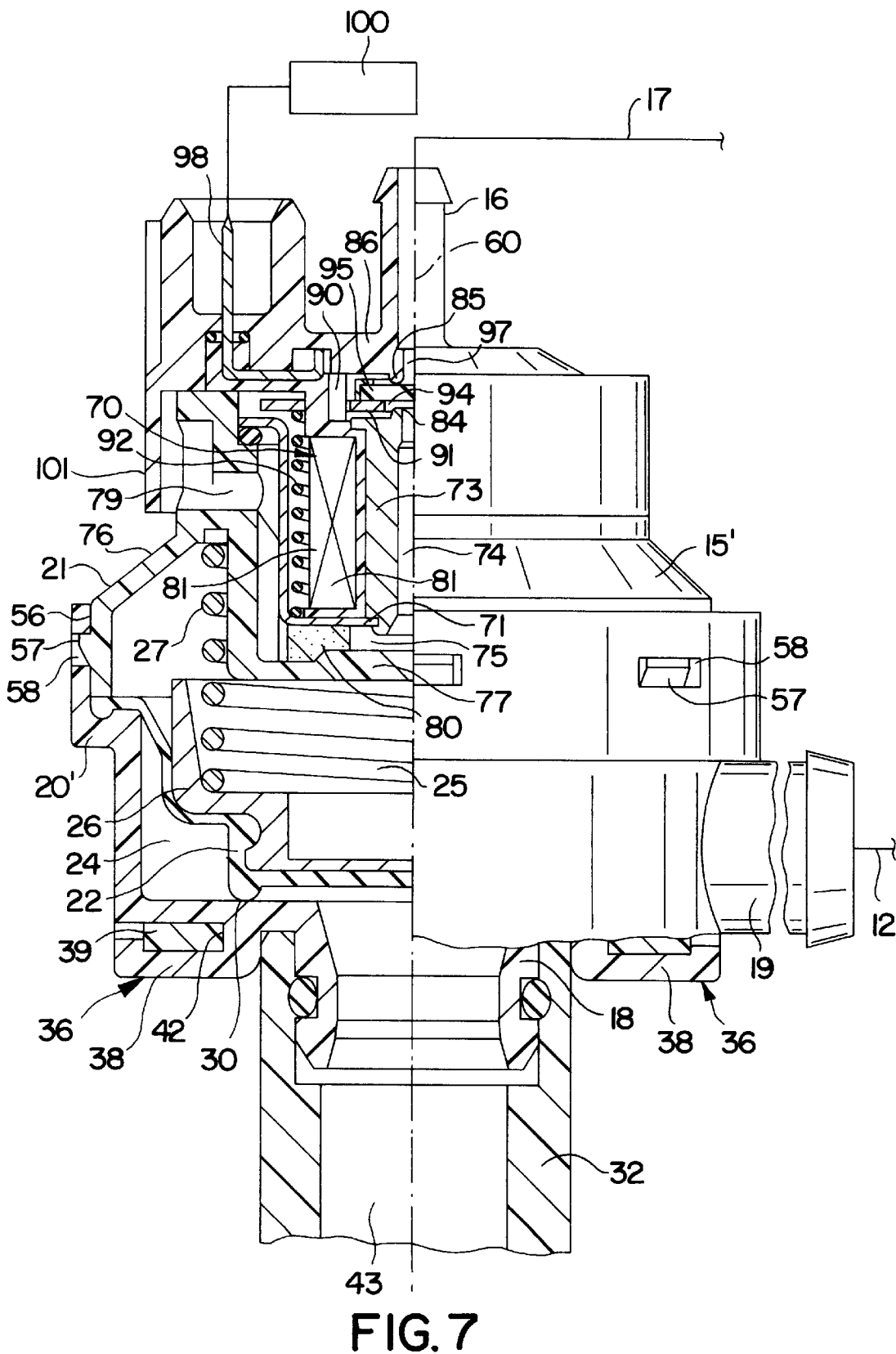
FIG. 7 shows a third exemplary embodiment of the valve according to the invention.

FIG. 7 shows a further exemplary embodiment, in which all the elements that are the same as or function the same as those of the previous exemplary embodiments have the same reference numerals. For securing the valve 15' of FIG. 7, a bayonet mount embodied as in FIG. 2 is provided. However, it is also possible for the bayonet mount to be embodied as in the second exemplary embodiment of FIG. 5. In a modification of the previous exemplary embodiments, the valve 15' is embodied as electromagnetically actuatable. The valve 15' again has a diaphragm 22, which is attached to a diaphragm plate 26. For switching the valve 15, an electromagnet 70 is provided; in an excited state the valve establishes a fluidic communication of the control chamber 25 with the negative pressure connection 16, so that the diaphragm 22, supported by the negative pressure in the intake tube 4, can lift more or less extensively from its sealing seat 30 in order to establish a fluidic communication from the connection stub 18 to the bypass stub 19. In the nonexcited state of the electromagnet 70, this fluidic communication is closed with the aid of the force of the spring 27, which presses the diaphragm 22 against its sealing seat 30, causing the valve 15' to assume a closing position when there is no current. The valve housing of the valve 15' is embodied in three parts and is composed of a cup-shaped lower housing part 20', a middle housing part 76, and a cap part 86. The middle housing part 76 and the lower housing part 20' are releasably connected to one another by a detent connection in the same way as shown in FIG. 2 and described in conjunction therewith.

The electromagnet 70 has a cup-shaped housing 71, made of magnetically conductive material, into which a tubular core 73 is riveted. A through bore 74 is provided in the core 73 and ends at a flow conduit 75, which is embodied between an outward bulge 77 of the middle housing part 76 and the housing 71 of the electromagnet 70 and which communicates with the ambient air via a bore 79. An annular filter 80 may be disposed in the flow conduit 75 between the bulge 77 and the housing 71. Inside the housing 71 of the electromagnet 70, the core 73 is surrounded by a magnet winding 81. The core 73 protrudes from the magnet winding 81 with a shoulder embodied as a first valve seat 84. Via the first valve seat 84, the through bore 74 of the core 73 discharges into a chamber 90 formed between the housing 71 of the electromagnet 70 and the cap part 86. In the chamber 90, opposite the core 73, an axially displaceable platelike flat armature 91 is provided. Coaxially with the magnet winding 81, a compression spring 92 is provided between the magnet winding 81 and the housing 71; this spring is supported by one end on the housing 71 of the electromagnet 70 and by the other end on the flat armature 91. In the region of the first valve seat 84, the flat armature 91 has an opening 94, into which the annular first valve seat 84 protrudes, and which is covered on the side of the flat armature 91 remote from the first valve seat 84 by a sealing element 95, a shallow rubber part, that is joined to the flat armature 91. In the cap part 86, toward the sealing element 94 of the flat armature 91, a second valve seat 84 is provided, into which a flow bore 97 of the negative pressure connection 16 embodied on the cap part 86 discharges. The electrical triggering of the valve 15' can be done by an electronic control unit 100, which is connected to the valve 15' via an electric plug connection 98.

As shown in FIG. 7, when the electromagnet 70 is not excited, the flat armature 91 is displaced by the compression spring 92 toward the second valve seat 85, which is closed by the sealing element 95. In this position, ambient air can reach the first valve seat 84 via the bore 79, which is covered with clearance by a lug 101 of the cap part 86 to reduce the threat of soiling, and from the first valve seat this air can flow into the control chamber 25 via a fluidic communication not shown in further detail. In this process, the diaphragm 22 is pressed against the sealing seat 30, also with the cooperation of the spring 27, so that there is no flow from the connection stub 18 to the bypass stub 19. When the electromagnet 70 is excited, the flat armature 91 is drawn to the core 73, and the sealing element 95 closes the first valve seat 84 and opens the second valve seat 85, so that air can flow out of the control chamber 25 into the negative pressure connection 16 via the second valve seat 85. This causes the diaphragm 22 to lift away from the sealing seat 30, thus enabling a flow via the connection stub 18, the sealing seat 30, and the bypass stub 19. By suitable switching of the electromagnet 70 by means of the electronic control unit 100, precise regulation of the air quantity in the bypass line 12 is possible, so as to obtain a precisely predeterminable pressure downstream of the compressor device.

The embodiment of the bayonet mount shown and described in the exemplary embodiments of FIGS. 2–7 can naturally be reversible in such a way that the bayonet lock 39 is formed on the valve 15, 15' and the bayonet locking bar 36 is formed on the receiving element 32.

The foregoing relates to preferred exemplary embodiments of the invention, it being understood that other variants and embodiments thereof are possible within the spirit and scope of the invention, the latter being defined by the appended claims.

We claim:

1. An internal combustion engine comprising an intake device in combination with a turbocharger, and a bypass line that leads around the turbocharger, a valve secured in said bypass line for opening or closing the bypass line, the intake device (4) has a tubular receiving element (32), into which the valve (15) is introduced at least partway and is secured to the receiving element (32) by a bayonet mount, the bayonet mount (36, 42, 42', 44, 47, 61) is formed by at least one bayonet locking bar (36), which is embodied in a form of an angle piece (42) that protrudes from a lower face (23) of a housing part (20) of the valve (15,15'), said angle piece locks together with a bayonet lock (39) provided on the receiving element (32), and the bayonet lock (39) is formed by recesses (44, 61) and notches (47) provided on a collar (50) which is embodied on the receiving element (32) of the intake device (4).

2. A valve in accordance with claim 1, in which the angle piece (42') protrudes radially inward from a lower face (23) of the housing part (20).

3. A valve in accordance with claim 2, in which the angle piece (42; 42'), on an end (40), has a detent lug (41) oriented toward the lower face (23) of the housing part (20).

4. A valve in accordance with claim 3, in which the detent lug (41) locks in notches (47) or recesses (61) provided on a collar (50) embodied on the receiving element (32).

5. A valve in accordance with claim 4, in which the valve (15') is embodied as electromagnetically actuatable.

6. A valve as set forth in claim 1, in which said valve is operative in combination with an internal combustion engine.

7. A valve in accordance with claim 1, in which the valve (15, 15') is made of at least two housing parts (20, 21), which are releasably connected to one another by means of a detent connection (57, 58).

8. A valve in accordance with claim 1, in which the valve (15, 15') has a diaphragm (22), which is actuatable by means of negative pressure from the intake device (4).

9. A valve in accordance with claim 1, in which the valve (15') is embodied as electromagnetically actuatable.

10. An internal combustion engine comprising an intake device in combination with a turbocharger, and a bypass line that leads around the turbocharger, a valve secured in said bypass line for opening or closing the bypass line, the intake device (4) has a tubular receiving element (32), into which the valve (15) is introduced at least partway and is secured to the receiving element (32) by a bayonet mount, the bayonet mount (36, 42, 42', 44, 47, 61) is formed by at least one bayonet locking bar (36), which is embodied in a form of an angle piece (42) that protrudes from a lower face (23) of a housing part (20) of the valve (15, 15'), said angle piece protrudes radially outward from a lower face (23) of the housing part (20) and locks together with a bayonet lock (39) provided on the receiving element (32).

11. A valve in accordance with claim 10, in which the angle piece (42; 42'), on an end (40), has a detent lug (41) oriented toward the lower face (23) of the housing part (20).

12. A valve in accordance with claim 11, in which the detent lug (41) locks in notches (47) or recesses (61) provided on a collar (50) embodied on the receiving element (32).

13. A valve as set forth in claim 10, in which said valve is operative in combination with an internal combustion engine.

14. A valve in accordance with claim 10, in which the angle piece (42') protrudes radially inward from a lower face (23) of the housing part (20).

15. A valve in accordance with claim 14, in which the angle piece (42; 42'), on an end (40), has a detent lug (41) oriented toward the lower face (23) of the housing part (20).

16. A valve in accordance with claim 15, in which the detent lug (41) locks in notches (47) or recesses (61) provided on a collar (50) embodied on the receiving element (32).

17. A valve in accordance with claim 10, in which the valve (15, 15') is made of at least two housing parts (20, 21), which are releasably connected to one another by means of a detent connection (57, 58).

18. A valve in accordance with claim 10, in which the valve (15, 15') has a diaphragm (22), which is actuatable by means of negative pressure from the intake device (4).

* * * * *